US006654997B2

(12) United States Patent
Donovan et al.

(10) Patent No.: US 6,654,997 B2
(45) Date of Patent: Dec. 2, 2003

(54) RIVET REMOVAL TOOL AND METHOD (75) Inventors: Steven P. Donovan, Roscoe, IL (US); David C. Goss, Rockford, IL (US); Richard A. Swedberg, Beloit, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/005,018

(22) Filed: Dec. 4, 2001

(65) Prior Publication Data

US 2003/0101568 A1 Jun. 5, 2003

(51) Int. Cl.[7] ................................................ B23P 19/02
(52) U.S. Cl. ........................ 29/426.4; 408/1 R; 408/84; 408/110; 29/244; 29/270; 29/402.01
(58) Field of Search ............................. 29/426.4, 244, 29/243, 270, 267, 268, 426.1–426.5, 402.01–402.08; 408/1 R, 84, 107, 103, 110, 112, 117, 67, 202, 241, 97

(56) References Cited

U.S. PATENT DOCUMENTS

| 4,010,532 A | * | 3/1977 | Streeter ........................ 29/267 |
| H419 H | * | 2/1988 | Ross ........................... 29/426.4 |
| 4,810,137 A | * | 3/1989 | Yang ............................. 408/100 |
| 5,046,900 A | * | 9/1991 | Heiter et al. ..................... 408/84 |
| 5,228,811 A | * | 7/1993 | Potter ............................ 408/84 |
| 5,551,816 A | * | 9/1996 | Brewer et al. .................. 411/43 |
| 5,893,684 A | * | 4/1999 | Skaggs ......................... 408/1 R |
| 5,961,257 A | * | 10/1999 | Bettini et al. ................... 408/97 |
| 6,092,964 A | * | 7/2000 | El Dessouky et al. ........ 408/1 R |
| 6,203,253 B1 | * | 3/2001 | Perrault ......................... 408/84 |
| 6,240,614 B1 | * | 6/2001 | Kojima et al. .............. 29/426.4 |
| 6,427,336 B1 | * | 8/2002 | Kojima et al. ................. 30/180 |

* cited by examiner

Primary Examiner—Gregory Vidovich
Assistant Examiner—Stephen Kenny
(74) Attorney, Agent, or Firm—Trexler, Bushell, Giangiorgi, Blackstone & Marr, Ltd.

(57) ABSTRACT

A device and method of removing a rivet which has been installed on a work piece. The method includes clamping a hand held device having springs onto the work piece, engaging a drill with a drill bit of the hand held device, the springs applying a pre-load force to the drill bit, operating the drill, thereby causing the springs to apply an increased load force to the drill bit and causing the drill bit to drill into a button of the rivet, unclamping and removing the hand held device from the work piece, and using a compression tool to remove the rivet from the work piece. The compression tool includes a push out portion configured to push out the rivet, and a recess is disposed generally opposite the push out portion for catching the rivet as the rivet is pushed out.

16 Claims, 11 Drawing Sheets

RIVET REMOVAL TOOL AND METHOD

BACKGROUND OF THE INVENTION

This invention generally relates to tools and methods for removing a rivet after it has been installed, and more specifically relates to a rivet removal tool and method which eliminates, or at least substantially reduces, the end load which must be applied to drill out a button and remove a rivet.

Self-piercing rivets are used in many different applications in order to secure two or more work pieces together. When a self-piercing rivet is installed, it is pushed into engagement with the work pieces such that a portion of the rivet expands and the work pieces deform around the expanded portion of the rivet. The expanded portion of the rivet becomes effectively embedded or encapsulated in the work pieces, thereby securing the work pieces together. The deformation of the work pieces causes a protrusion, often referred to as a "button", to form on the other side (i.e. the blind side) of the rivet, and the button includes the expanded portion of the rivet therein.

Sometimes, it is desirable to remove a rivet after it has been installed. One example is when the work pieces have become misaligned, such as during the riveting process. Prior art practices of removing a rivet after it has been installed involve initially grinding off the button. Attempting to remove a rivet by first grinding of the button is undesirable for several reasons. The grinding operation often requires that a relatively substantial end load be applied to the button (i.e. to the grinder which engages the button). This may be very difficult to achieve in light of the position of the rivet and the particular application. Even if it is possible to grind off the rivet, it becomes very difficult to push out the rivet because of the uneven ground surface. Lining up of a push out tool to the ground rivet is done by sight, which may be difficult if the rivet is in a position that is hard to see. This may also distort the hole if not lined up properly making it less likely to put a rivet back in the hole. Additionally, if the grinder slips during the grinding, it may mar the work piece. Finally, the grinding causes dust to spray into the air. This is undesirable and may create a workplace hazard, especially if the dust which sprays into the air is toxic.

OBJECTS AND SUMMARY OF THE INVENTION

A general object of an embodiment of the present invention is to provide a hand held device for drilling into a button, where the hand held device eliminates, or at least substantially reduces, the end load which must be applied to remove a rivet.

Another object of an embodiment of the present invention is to provide a hand held device for removing a button without an end load being applied by the user.

Another object of an embodiment of the present invention is to provide a method of removing a rivet, where the method provides that the rivet can be removed without spraying dust into the air.

Briefly, and in accordance with at least one of the foregoing objects, an embodiment of the present invention provides a hand held device for drilling into a button on a work piece. The hand held device includes a handle which is configured to be actuated to effect clamping of the hand held device onto the work piece. Support structure is connected to the handle, and a drill bit is disposed on the support structure. The drill bit is configured such that the button which is created upon installation of a rivet into the work pieces can be drilled into using the drill bit. Preferably, the hand held device includes a depth adjuster member, such as an adjustable collar, which is disposed on the drill bit such that the depth to which the drill bit drills into the button can be adjusted. The support structure may be generally integral with the handle of the hand held device, or can be provided as separate tooling which is engageable with a conventional hand held clamping device. Preferably, the hand held device is configured to apply an end load to the drill bit, so the user need not do so.

To remove the rivet from the work piece, the hand held device is clamped onto the work piece, a drill is engaged with a drill bit, and the drill is operated to cause the drill bit to drill a recess into the button. Then, the hand held device is un-clamped and removed from the work piece, and a compression tool is used to remove the rivet from the work piece.

Specifically, a push out portion of the compression tool is engaged with the recess formed in the work piece to push the rivet out of the work piece and into a recess provided by the compression tool.

To provide such a compression tool having a push out portion and a recess for catching the rivet, a pair of bits may be provided for engagement with the compression tool, wherein one bit provides the push out portion and the other bit provides the recess for catching the rivet.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the present invention may be susceptible to embodiment in different forms, there is shown in the drawings, and herein will be described in detail, an embodiment thereof with the understanding that the present description is to be considered an exemplification of the principles of the invention and is not intended to limit the invention to that as illustrated and described herein.

Figures 1, 2:
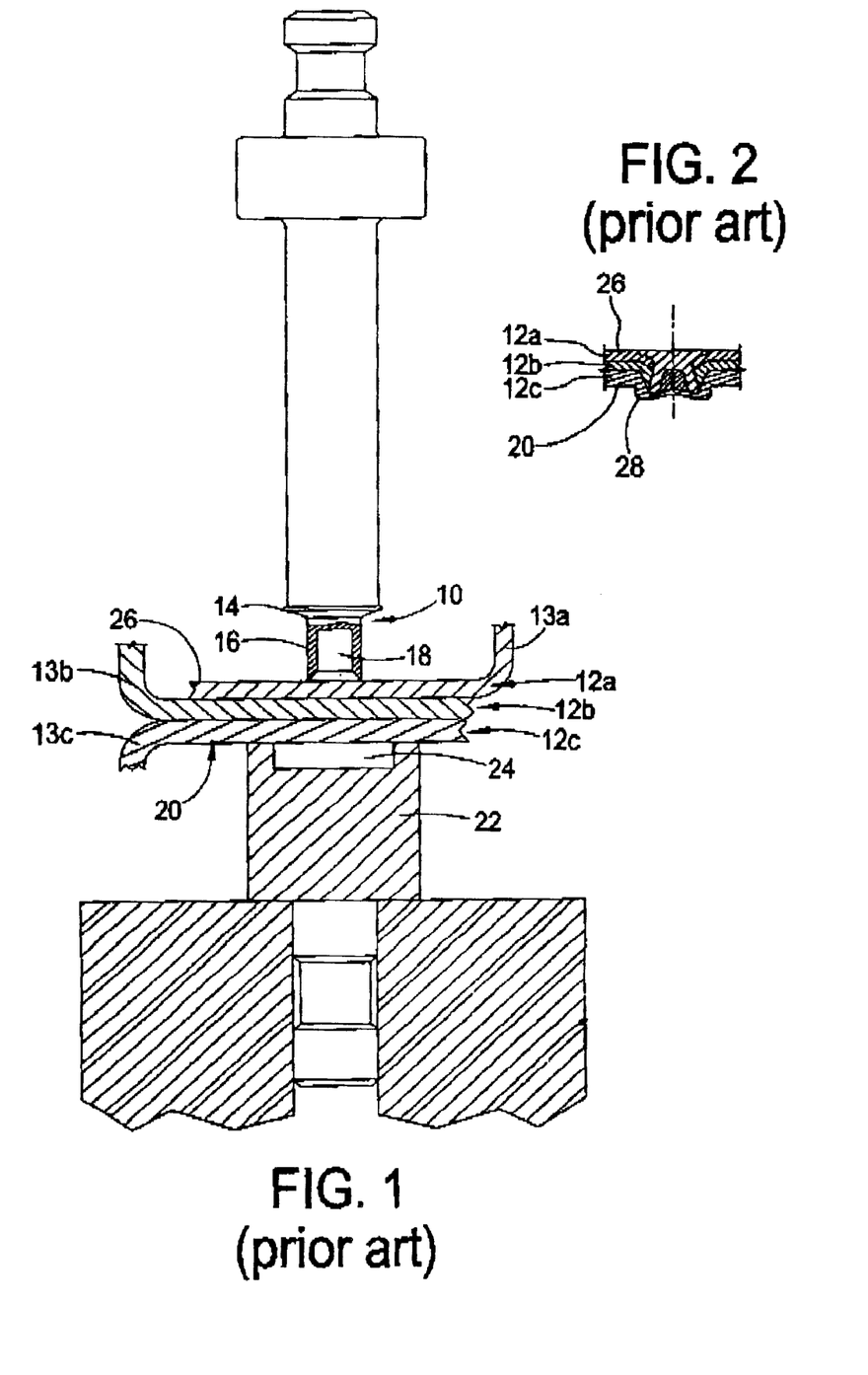
FIG. 1 is a cross sectional view of a self piercing rivet positioned for installation into a work piece.
FIG. 2 is a cross sectional view of an installed rivet.

The method and apparatus of the present invention is used to remove rivets which have been installed in work pieces. Typically, the method and apparatus of the present invention are used to remove rivets of the self-piercing type. FIG. 1 illustrates a typical self-piercing rivet 10 positioned for installation into a work piece 12. Although the method and apparatus of the present invention can be used to remove rivets from a variety of work pieces, a particular application will be described herein. The work piece 12 shown in FIG. 1 is a drip rail which is used to divert water away from openings in a vehicle, for example, the opening around a window. The work piece 12 consists of three layers, the first layer or outside drip rail 12a, the second layer or inside drip rail 12b and the third layer or frame of the vehicle 12c. The first layer 12a includes an upwardly directed flange 13a, the second layer 12b includes an upwardly directed flange 13b, and the third layer 12c includes a downwardly directed flange 13c. The rivet 10 includes an enlarged head portion 14 and a stem portion 16. A cavity 18 is provided within the stem portion 16. The rear side 20 of work piece 12 abuts an anvil 22 which provides resistance upon installation of the rivet 10. A recess 24 is provided in the anvil 22. The recess 24 will receive a deformed portion of the work pieces upon installation of the rivet 10. Installation of the rivet 10 will begin as the rivet 10 pierces the front side 26 of the work piece 12.

FIG. 2 illustrates the rivet 10 as installed within the work piece 12. As shown in FIG. 2, upon installation, the rivet has pierced the front side 26 of the work piece 12, the first layer 12a and the second layer 12b. The third layer 12c has not been pierced. As a result of the installation process, a button 28 has been formed which protrudes from the rear side 20 of the work piece 12. Also, upon installation, the cavity 18 of the rivet 10 is filled with material from the work piece 12.

As described above, it may become necessary to remove the rivet 10 from the work piece 12. In such situations, the apparatus and method of the present invention can be used to effectuate the removal of the rivet 10. The method of the present invention uses two tools to remove the rivet 10 from the work piece 12. First, a hand held device or drilling tool 30 (shown in FIGS. 3–10) is used to remove the button 28 of the rivet 10, and then a compression tool 32 (shown in FIGS. 11–13) is used to eject the rivet 10 from the work piece 12.

Figure 3:
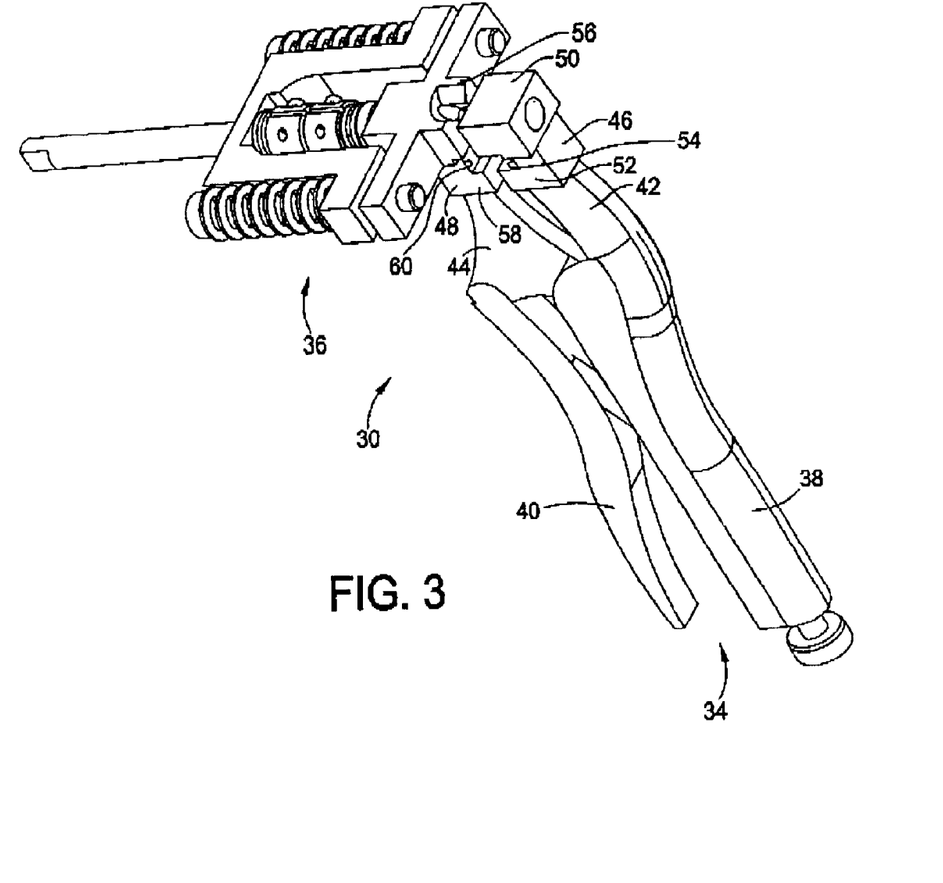
FIG. 3 is a perspective view of a drilling device which is in accordance with an embodiment of the present invention.

As shown in FIG. 3, the drilling tool 30 generally includes a handle portion 34 and tooling or support structure 36. The handle portion 34 includes a front handle portion 38 and a rear handle portion 40. A front jaw member 42 extends from the front handle portion 38 and a rear jaw member 44 extends from the rear handle portion 40. The front and rear handle portions 38, 40 and the front and rear jaw members 42, 44 can be, for example, of the type used with a hand-held clamping device, such as the hand-held tool commonly called a vise grips.

Figure 4:
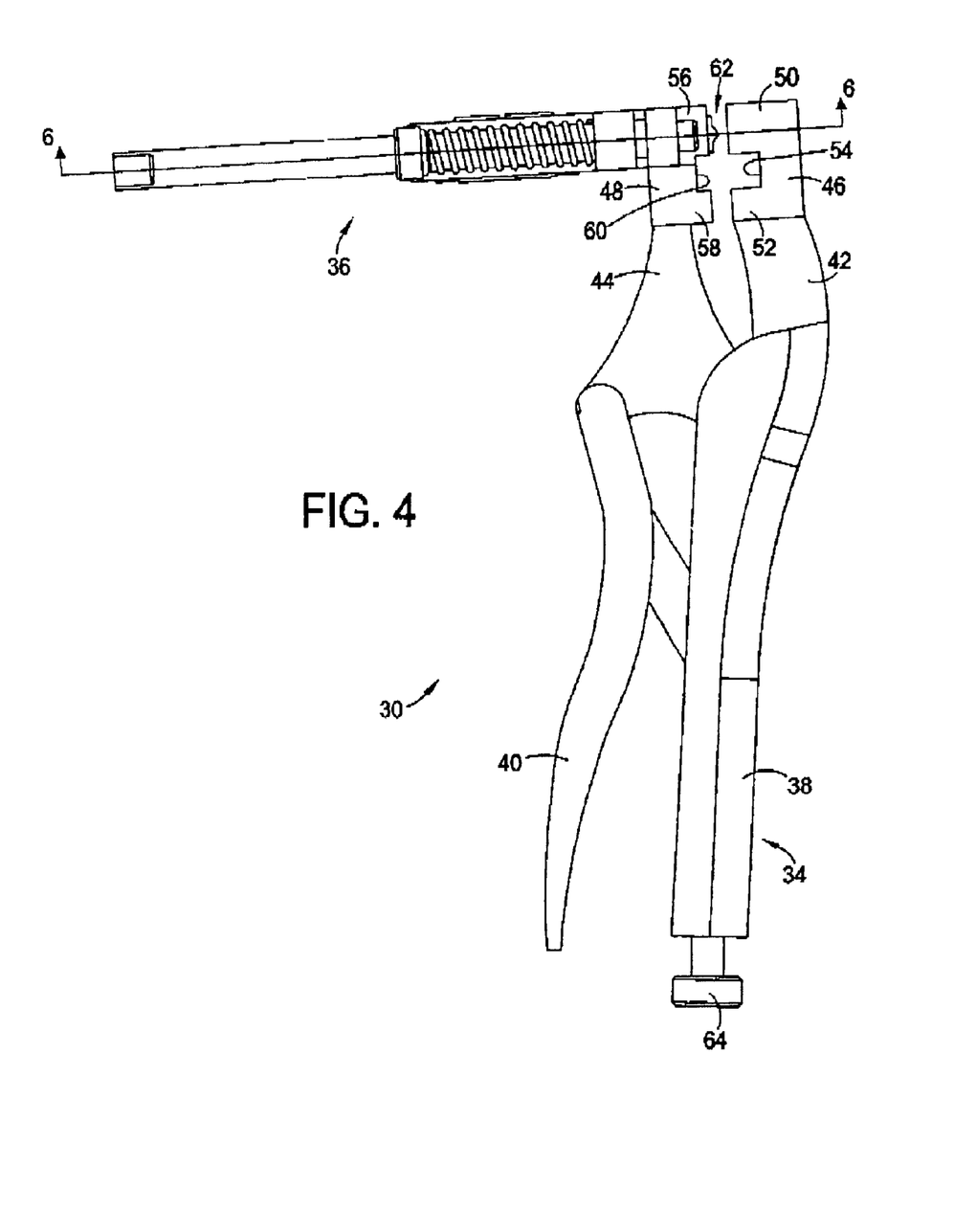
FIG. 4 is a side-elevational view of the device shown in FIG. 3.

A U-shaped front tooth 46 extends from the front jaw member 42 and a U-shaped rear tooth 48 extends from the rear jaw member 44. The front tooth 46 includes an upper prong 50, a lower prong 52, and a recess 54 between the upper prong 50 and the lower prong 52. The rear tooth 48 includes an upper prong 56, a lower prong 58, and a recess 60 between the upper prong 56 and the lower prong 58. As shown in FIG. 4, the front tooth 46 is aligned with the rear tooth 48 such that the upper prong 50 of the front tooth 46 is aligned with the upper prong 56 of the rear tooth 48 and the lower prong 52 of the front tooth 46 is aligned with the lower prong 58 of the rear tooth 48. A mouth 62 is provided between the front tooth 46 and the rear tooth 48. The mouth 62 is enlarged as the front handle portion 38 and the rear handle portion 40 are moved away from each other. The mouth 62 is closed as the front handle portion 38 and the rear handle portion 40 are moved toward each other. A thumb screw 64 is provided for adjusting the drilling tool 30 on the work piece 12. As the thumb screw 64 is turned in one direction the mouth 62 of the drilling tool becomes smaller and as the thumb screw 64 is turned in the opposite direction, the mouth 62 of the drilling tool becomes larger.

Figure 5:
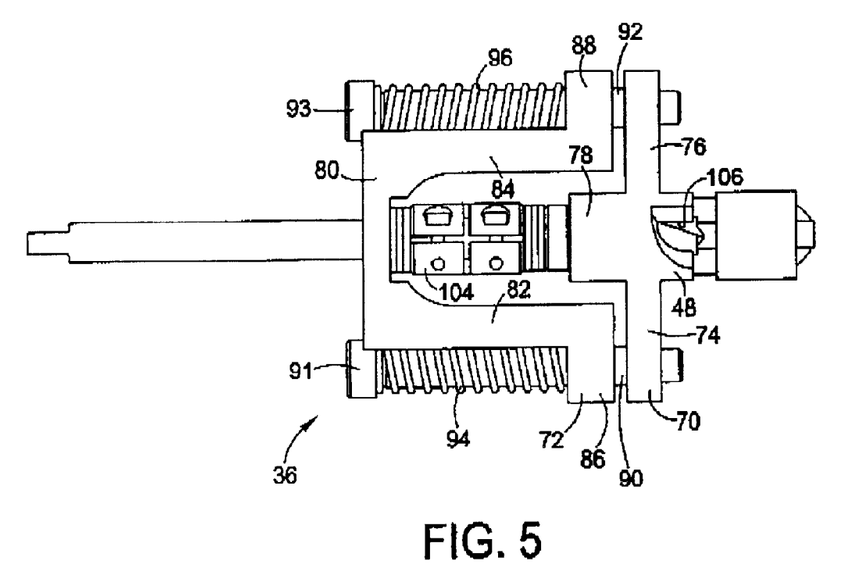
FIG. 5 is a front-elevational view of the device shown in FIG. 3.

As shown in FIG. 5, the support structure 36 includes a generally T-shaped first member 70 and a generally U-shaped second member 72. The first member 70 includes the rear tooth 48, a first pin support 74 extending from one side of the rear tooth 48, a second pin support 76 extending from the opposite side of the rear tooth 48, and a collar platform 78 extending from the rear side of the rear tooth 48.

The second member 72 of the support structure 56 includes a base 80, a first arm 82, a second arm 84, a first spring plunger 86 and a second spring plunger 88. The base 80 is generally parallel to the first and second pin supports 74, 76. The first and second arms 82, 84 extend from either end of the base 80 and are generally perpendicular to the base 80. The first spring plunger 86 is generally perpendicular to the first arm 82 and extends from the opposite end of the first arm 82 as the base 80. The second spring plunger 88 is generally perpendicular to the second arm 84 and extends from the opposite end of the second arm 84 as the base 80. In describing the tool 30 the term proximal will be used to describe items closest to the base 80 and the term distal will be used to describe items closest to the first member 70.

The first member 70 is connected to the second member 72, through a first pin 90 and a second pin 92. The first pin 90 extends through an aperture in the first spring plunger 86 and through an aperture in the first pin support 74. The second pin 92 extends through an aperture in the second spring plunger 88 and through an aperture in the second pin support 76. Threads are provided on the surface of the apertures in the first and second pin support members 74, 76 which engage with threads on the surface of one end of each pin 90, 92. Enlarged portions 91, 93 are provided on the opposite ends of each of the pins 90, 92 respectively. A first spring 94 is mounted around the first pin 90 and is seated between the the first spring plunger 86 and the enlarged portion of 91 of the first pin 90. A second spring 96 is mounted around the second pin 92 and is seated between the second spring plunger 88 and the enlarged portion 93 of the second pin 92.

Figure 6:
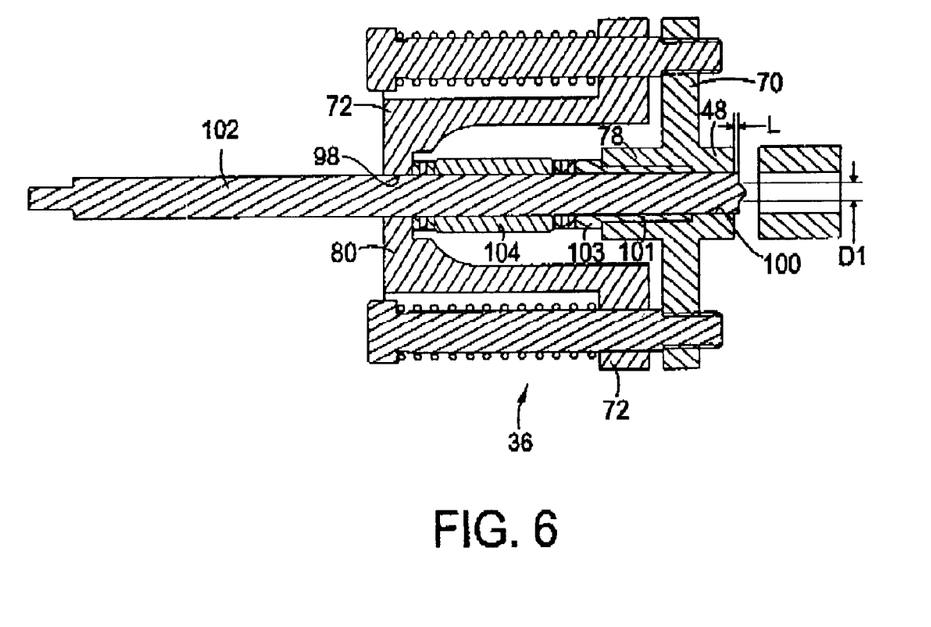
FIG. 6 is a cross-sectional view of the drilling device shown in FIG. 3, taken along line 6—6 of FIG. 4.

As shown in FIG. 6, an aperture 98 is provided in the center of the base portion 80 of the second member 72 of the support structure 36. An aperture 100 is also provided through the collar platform 78 and the rear tooth 48 of the first member 70. The aperture 98 is aligned with the aperture 100. A sleeve 101 is positioned within the aperture 100 and has an enlarged portion 103 which extends beyond the aperture in the collar platform 78. A drill bit 102 is mounted through the apertures 98, 100 and through the sleeve 101 such that the rear end of the drill bit 102 extends proximally through the aperture 98 and the cutting end of the drill bit 102 extends distally through the aperture 100. A conical tip 108 is provided on the cutting end of the drill bit 102. The diameter of the drill bit 102 is slightly larger than the diameter of the button 28 on the rear side 20 of the work piece 12 and the diameter of the apertures 98, 100 and the aperture through the sleeve 101 are slightly larger than the diameter of the drill bit 102.

A collar or depth adjuster 104 is mounted on the drill bit 102 between the base 80 of the first member 70 and the sleeve 101. The collar 104 is designed to slide axially along the drill bit 102 between the sleeve 101 which abuts the collar platform 78 of the first member 70 and the base 80 of the second member 72. The collar 104 can be, for example, a common split sleeve fastener. Once the collar 104 has been correctly positioned, the collar 104 is locked in place by tightening the split sleeve fastener. The collar 104 is used to adjust the distance the drill bit 102 can travel and therefore the depth of the hole to be drilled as will be described herein.

The cutting end and conical tip 108 of the drill bit 102 extends through the aperture 100 in the rear tooth 48. A chip removal slot 106 is provided in the rear tooth 48 for the removal of the drilling debris. The rear end of the drill bit 102 extends beyond the second member 72 of the support 36.

Use of the tool 30 begins by the setting a depth L to which the drill bit 102 will cut into the rivet 10. The collar 104 is loosened to allow the drill bit 102 to be positioned within the drilling tool 30. The distance the conical tip 108 of the drill bit 102 is positioned beyond the rear tooth 48 will determine the depth L to which the drill bit 102 will cut into the rivet 10. Typically the drill bit 102 is positioned so that the button 28 is removed to a depth which leaves the button 28 generally flush with the rear side 20 of the work piece 12.

After the depth L is set, the collar 104 and the drill bit 102 are forced down to sleeve 101 by a pre-load spring force from springs 94, 96. The pre-load spring force of springs 94, 96 further forces base 80 down against the collar 104 which, in turn, is forced down against the sleeve 101, thus creating a positive stop between the collar 104 and the enlarged portion 103 of the sleeve 101. The tool 30 thus generates a pre-load as the springs 94, 96 have a built in spring force which is present at each step of the rivet removal process, such that users do not have to supply an end load to the tool 30 to get the drill bit 102 to move forward.

The jaw members 42, 44 of the drilling tool 30 are opened by opening the front and rear handle portions 38, 40. The front jaw member 42 is positioned near the front side 26 of the work piece 12 and the rear jaw member 44 is placed near the rear side 20 of the work piece 12. The drilling tool 30 is positioned so that button 28 created upon installation of the rivet 10 is positioned centrally within the aperture 100 and the drill bit 102 is centrally aligned with the button 28.

Figure 7:
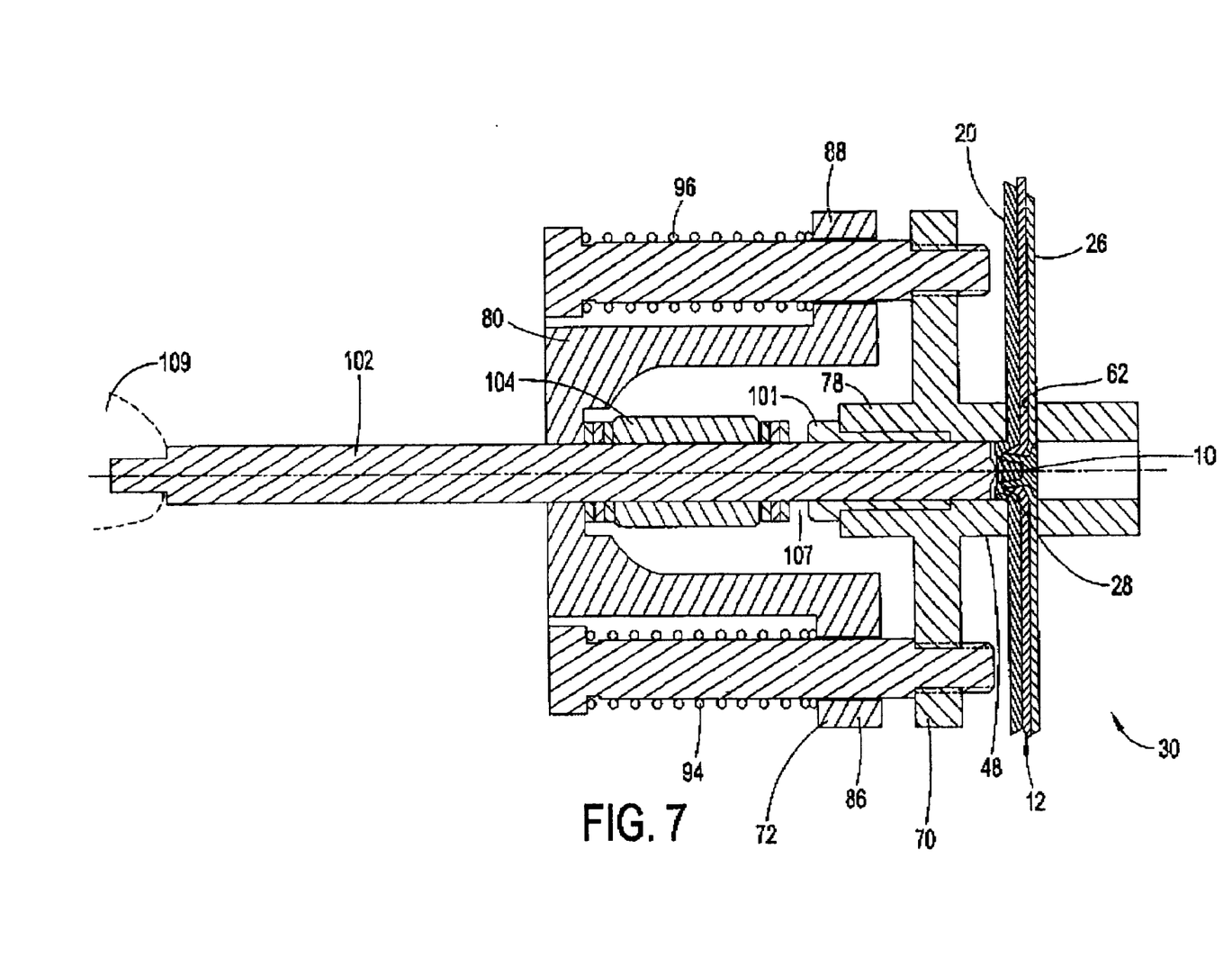
FIG. 7 is a cross-sectional view of the device shown in FIG. 3 along with a cross-sectional view of a rivet installed in a work piece.

As shown in FIG. 7, the mouth 62 of the tool 30 is placed around the work piece 12 and the rear tooth 48 contacts the rear side 20 of the work piece 12 and the conical tip 108 of the drill bit 102 contacts an indentation in the button 28 to assist centering of the tool 30. Pre-loading of the drill bit 102 generated by the springs 94, 96, assists and maintains the centering of the drill bit 102 to the button 28 of the rivet 10. As the drilling tool 30 is fastened on to the work piece 12, the button 28 of the rivet 10 contacts the conical tip 108 of the drill bit 102 and the drill bit 102 is forced proximally. As the drill bit 102 is forced toward the user, the collar 104 pushes against the base 80 of the second member 72, and first and second spring plungers 86, 88 compress the springs 94, 96. Upon compression of the springs 94, 96 a gap 107 is provided between the collar 104 and the sleeve 101. The compression of the springs 94, 96 provides an increased force to be released, over the pre-load force provided by the springs 94, 96, which eliminates the need for an end load to be applied by the user.

Figure 8:
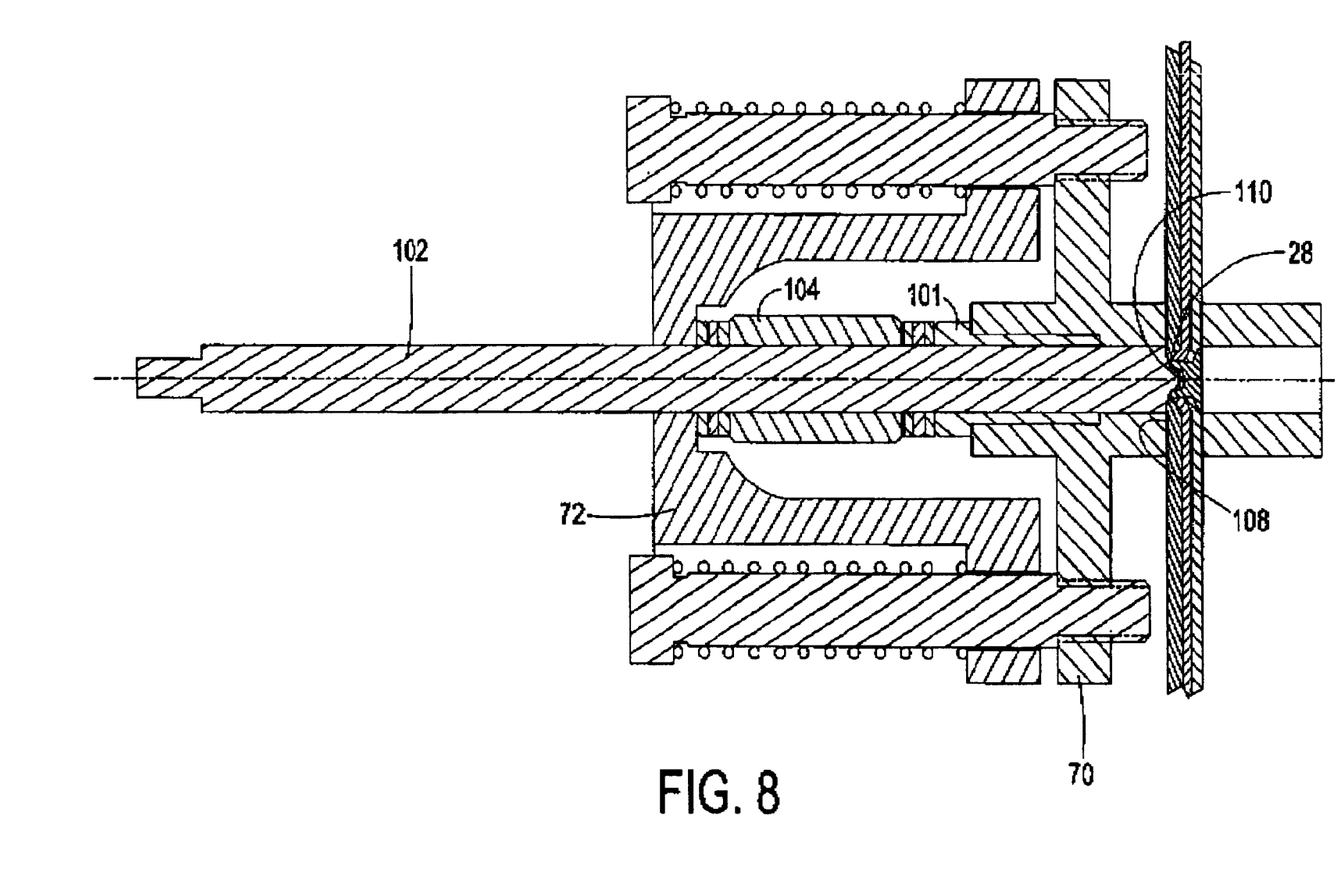
FIG. 8 is a cross-sectional view of the device shown in FIG. 3 along with a cross-sectional view of an installed rivet at an intermediate stage in the drilling process.

A drill 109 (a portion of which is shown in FIG. 7) is mounted to the rear end of the drill bit 102. Preferably, the point of the drill bit 102 is sized to a diameter D1, which is slightly larger than the rivet body diameter which reduces the push out forces. When power is supplied to the drill 109, the drill bit 102 will begin to rotate. As shown in FIG. 8, the conical tip 108 of the drill bit 102 contacts the button 28, and the button 28 is removed from the remainder of the work piece 12 by the drilling action of the drill bit 102. Debris from the drilling action exits through the chip removal slot 106 (see FIG. 5). As the drill bit 102 advances within the work piece 12, the increased spring force of the springs 94, 96 is released and the second member 72 moves toward the first member 70. The drill bit 102 and the collar 104 move with second member 72 as it advances toward the first member 70, closing the gap 107 between the collar 104 and the sleeve 101. The drill bit 102, collar 104 and second member 72 will continue to advance until the gap 107 has been eliminated and the collar 104 contacts the sleeve 101, which acts as a positive stop such that no further material can be removed from the rivet 10. As a result of the drilling action, the conical tip 108 of the drill bit 102 forms a concave recess 110 in the work piece 12.

Figure 9:
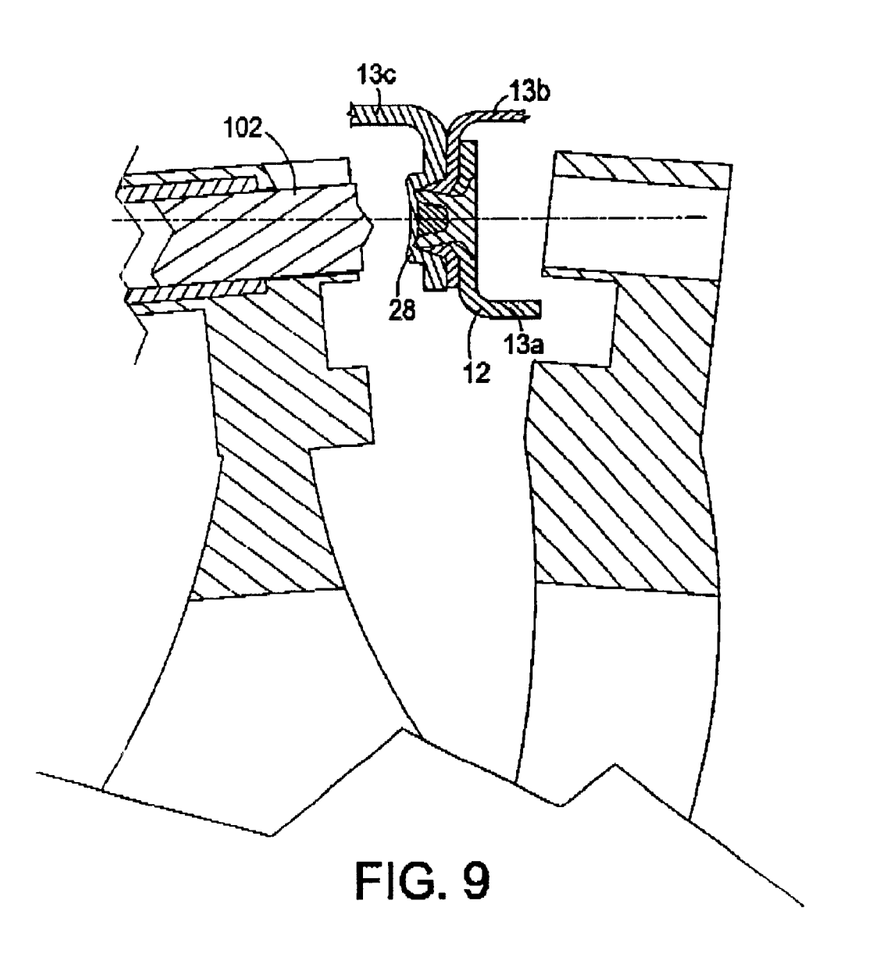
FIG. 9 is a cross-sectional view of a portion of the device shown in FIG. 3, along with a cross-sectional view of a rivet installed in a drip rail.

As shown in FIG. 9, when the drilling tool 30 is used in connection with a drip rail, the flange 13a is positioned within the recess 54, and flanges 13b and 13c remain outside of the mouth 62 of the drilling tool 30. The relative dimensions of the recess 54, the upper prong 50 of the front tooth 46, the upper prong 56 of the rear tooth 48 and the work piece 12 allow upper prong 50 to contact the front side 26 of the work piece 12 as the flange 13a is positioned within the recess 54.

The drilling tool 30 provides precise alignment of the drill bit 102 with the button 28 and provides for stabilization of the drill bit 102 with respect to the work piece 12. The spring force provided by springs 94, 96 eliminates the need for end force to be applied by the user. This also reduces the risk of the drill bit 102 slipping off the button 28 and marring the work piece 12. In addition, unlike the grinding process, the drilling process does not cause dust to spray into the air and therefore eliminates the risk of the user inhaling toxic dust particles.

Figure 10:
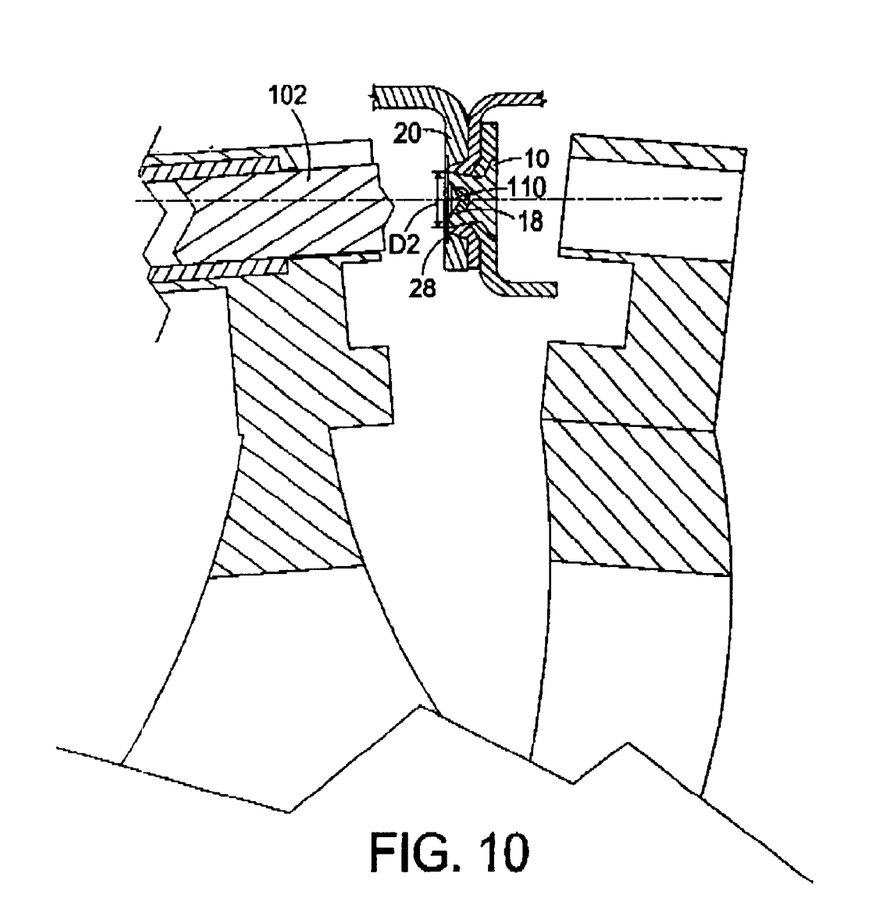
FIG. 10 is a cross-sectional view of a portion of the device shown in FIG. 3 along with a cross-sectional view of a rivet installed in a drip rail at a final stage of the drilling process.

Preferably, the drill bit 102 will be positioned within the collar 104 so that upon release of the increased spring force and completion of the drilling process, the button 28 is flush with the rear side 20 of the work piece 12 as shown in FIG. 10. The diameter D1 of the conical tip 108 is smaller than a flare diameter D2 of the rivet 10 at the drilled depth. Upon completion of drilling, the stem 16 of the rivet 10 will be exposed and the concave recess 110 will be centrally located in the cavity 18 of the rivet 10. This concave recess 110 will assist in aligning the compression tool 32 as will be described below. The drilling tool 30 is released from the work piece 12 by releasing the front handle portion 38 and the rear handle portion 40.

The compression tool 32 used to eject the rivet 10 from the work piece 12 will now be described. The compression tool 32 utilizes a conventional tool such as a compression riveter. For example, the compression/squeeze riveter (model number US114TA) sold by United States Industrial Tool & Supply Company can be used along with the bits 130, 132 to be described below, to eject the rivet 10 from the work piece 12. Additional information about the squeeze riveter sold by United States Industrial Tool & Supply Company can be found at www.ustool.com.

Figure 11:
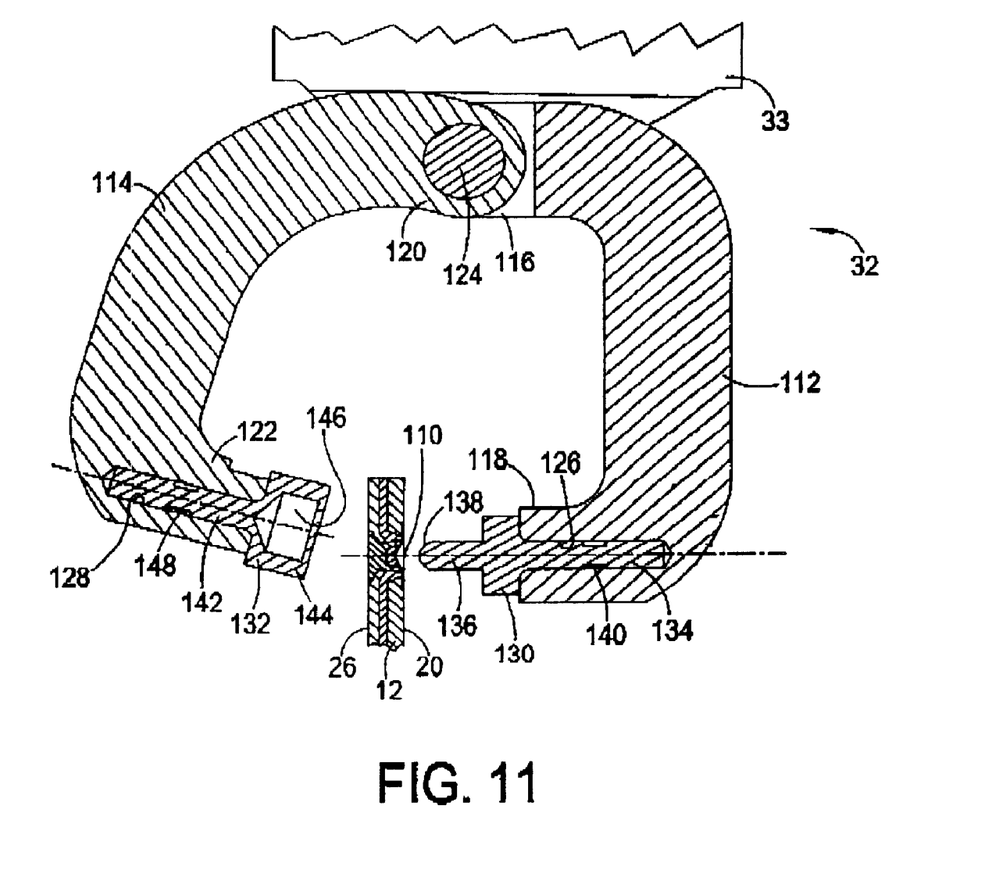
FIG. 11 is a cross-sectional view of a portion of the compression tool of the present invention along with a cross-sectional view of a rivet upon which the tool can be used.
Figure 12:
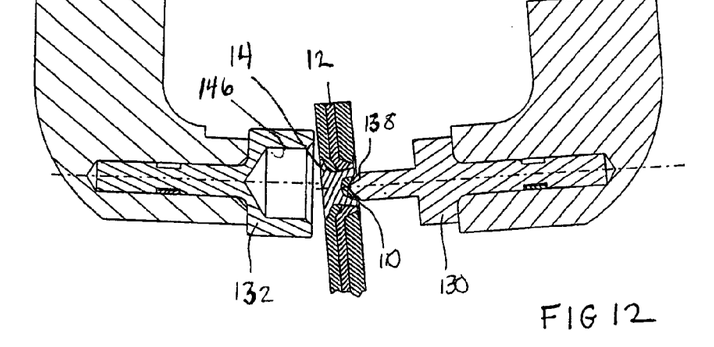
FIG. 12 is a cross-sectional view of a portion of the compression tool along with a cross-sectional view of a rivet to be removed from a work piece shown at an intermediate stage of the compression process.
Figure 13:
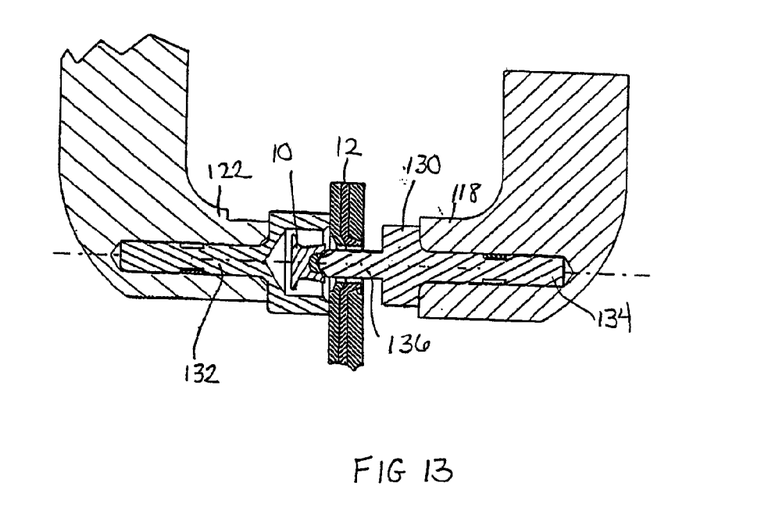
FIG. 13 is a cross sectional view of a portion of the compression tool along with a cross-sectional view of a rivet which has been removed from a work piece shown at a further stage in the compression process.

As shown in FIGS. 11–13, the compression tool 32 includes a body 33, a generally U-shaped first arm 112 and a generally U-shaped second arm 114. The body 33 contains the components necessary to activate the first arm 112 and the second arm 114. The first arm 112 includes a first end 116 and a second end 118. The second arm 114 includes a first end 120 and a second end 122. The first end 116 of the first arm 112 is joined to the first end 120 of the second arm 114 by a pin 124 which allows the arms 112, 114 to rotate relative to one another.

As shown in FIG. 11, a pushing bit 130 is mounted to the first arm 112. The pushing bit 130 includes an elongated mounting portion 134 and an elongated pushing end 136. A conically shaped tip 138 extends from the pushing end 136. The conically shaped tip 138 matches the recess 110 of the work piece 12 due to the conical tip 108 of the drill bit 102 which formed the recess 110. The matching of the conically shaped tip 138 and the recess 110 assists and maintains the centering of the compression tool 32 so that the rivet 10 can be removed with little or no distortion to the hole in the work piece 12. A passageway 126 is provided in the second end 118 of the first arm 112. The mounting portion 134 is positioned within the passageway 126 and a spring is placed within a groove 140 on the mounting portion 134 and retains the pushing bit 130 within the passageway 126.

A catching bit 132 is mounted to the second end 122 of the second arm 114. The catching bit 132 includes an elongated mounting portion 142 and an enlarged cup shaped catching end 144. A catching recess 146 is provided within the catching end 144. A passageway 128 is provided in the second end 122 of the second arm 114. The mounting portion 142 is positioned within the passageway 128 and a spring is placed within a groove 148 on the mounting portion 142 and retains the catching bit 132 within the passageway 128.

To remove the rivet 10 from the work piece 12, the work piece 12 is placed between the pushing bit 130 and the catching bit 132. The work piece 12 is aligned such that the front side 26 of the work piece 12 is proximate to the catching bit 132 and the rear side 20 of the work piece 12 is proximate to the pushing bit 130.

As shown in FIG. 12, the tip 138 of the pushing bit 130 is placed within the recess 110 of the work piece 12 and the catching bit 132 is aligned such that the head 14 of the rivet 10 is aligned with the recess 146 of the catching bit 132. As shown in FIG. 13, when the compression tool 32 is activated, the second end 118 of the arm 112 is driven toward the second end 122 of the second arm 114. The pushing end 136 of the pushing bit 130 is then driven through the layers 12c, 12b, 12a of the work piece 12 and the rivet 10 is ejected from the work piece 12. The ejected rivet 10 is captured within the recess 146 of the catching end 144. As the rivet 10 is pushed out of the work piece 12, an extremely high amount of energy is built up due to the fit between the rivet 10 and the work piece 12, such that when the rivet 10 starts to move, the stored up energy is released and the rivet 10 is ejected from the work piece 12 with a great amount of force. Thus, it is important that the rivet 10 is captured within the recess 146 to prevent injury to the user or another individual standing by.

Ejection of the rivet 10 from the work piece 12 using the compression tool 32 allows for efficient removal of the rivet without damage to the surfaces of the work piece 12. Upon removal of the rivet 10, the work pieces can be properly aligned and a new rivet can be installed.

While an embodiment of the present invention is shown and described, it is envisioned that those skilled in the art may devise various modifications of the present invention without departing from the spirit and scope of the appended claims. For example, it is to be understood that the present invention can be used with a work piece with any number of layers or with a variety of shaped work pieces including simply flat work pieces. As shown in FIGS. 9 and 10 for example, the dimensions of the front tooth 46 and the rear tooth 48 can be modified to accept these various shaped work pieces. Also, for example the drilling tool 30 and the compression tool 32 could be adapted for automation rather than hand activated.

What is claimed is:

1. A device for drilling into a button of a rivet installed an a work piece, device comprising:
   means for clamping the work piece;
   support structure connected to the clamping means; and
   a drill bit disposed on said support structure, said drill bit configured such that said drill bit is drillable into die button of the rivet, said device configured to apply an end load to said drill bit, wherein said support structure comprises a first member, a second member, at least one pin having an enlarged end, said at least one pin extending from said first member through said second member, and a spring disposed on said at least one pin between said enlarged end and said second member, wherein said drill bit extends through said first and second members.

2. A device as recited in claim 1, further comprising a depth adjuster member disposed on said drill bit.

3. A device as recited in claim 2, wherein said depth adjuster member comprises a collar disposed on said drill bit.

4. A device as recited in claim 3, wherein said collar is slidable and adjustable along the drill hit.

5. A device as recited in claim 1, wherein said at least one pin is threadedly attached to said first member.

6. A device as recited in claim 1, wherein said drill bit has a conical tip, and wherein the bottom has an indentation therein, whereby said conical bit assists in locating and centering said drill bit to the button of the rivet by being inserted into the indentation of the button of the rivet.

7. A device as recited in claim 1, said spring on said at least one pin provides a pre-load force to said drill bit to assist and maintain centering of said drill bit to the button of the rivet.

8. A method of using a device having springs to drill into a button of a rivet installed on a work piece, said method comprising: clamping the device onto the work piece; engaging a drill with a drill bit of the device, the springs applying a pre-load force to said drill bit; and operating the drill, thereby causing the springs to apply an increased load force to said drill bit and causing said drill bit to drill into the button of the rivet.

9. A method as recited in claim 8, further comprising drilling into the button such that a recess is formed therein.

10. A method as recited in claim 9, further comprising adjusting the device to adjust a depth of cut of said drill bit during operation of said drill.

11. A method as recited in claim 10, further comprising adjusting a depth adjuster member which is disposed on said drill bit.

12. A device for drilling into a button of a rivet installed on a work piece, device comprising:

means for clamping the work piece;

support structure connected to the clamping means; and a drill bit disposed on said support structure, said drill bit configured such that said drill bit is drillable into the button of the rivet, said device configured to apply an end load to said drill bit, wherein said support structure comprises a first member, a second member, and a spring which biases said second member toward said first member, wherein said drill bit extends through said first and second members.

13. A device as recited in claim 12, further comprising a depth adjuster member disposed on said drill bit.

14. A device as recited in claim 13, wherein said depth adjuster member comprises a collar disposed on said drill bit.

15. A device as recited in claim 14, wherein said collar is slidable and adjustable along the drill bit.

16. A device as recited in claim 12, wherein the device includes two springs which bias said second member toward said first member.

* * * * *

UNITED STATES PATENT AND TRADEMARK OFFICE
CERTIFICATE OF CORRECTION

PATENT NO.   : 6,654,997 B2
DATED        : December 2, 2003
INVENTOR(S)  : Steven P. Donovan, David C. Goss and Richard A. Swedberg It is certified that error appears in the above-identified patent and that said Letters Patent is hereby corrected as shown below:

Column 8,
Line 32, "into die" should read -- into the --
Line 56, "in claim 1, said" should read -- in claim 1, wherein said --

Signed and Sealed this

Twenty-third Day of March, 2004

JON W. DUDAS
*Acting Director of the United States Patent and Trademark Office*